(12) United States Patent
Dybdahl et al.

(10) Patent No.: US 8,666,810 B1
(45) Date of Patent: Mar. 4, 2014

(54) SYSTEM AND METHOD FOR ONLINE UNIQUE USERS AND FREQUENCY ESTIMATION FOR ADVERTISEMENTS ON A VIDEO SHARING WEBSITE BASED ON AUCTION HISTORY RESULTS

(75) Inventors: Haakon Dybdahl, Trondheim (NO); Reto Strobl, Walenstadt (CH)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/399,240

(22) Filed: Feb. 17, 2012

(51) Int. Cl.
*G06Q 30/00* (2012.01)

(52) U.S. Cl.
USPC ...................................................... 705/14.45

(58) Field of Classification Search
USPC ...................................................... 705/14.45
See application file for complete search history.

(56) References Cited

U.S. PATENT DOCUMENTS

| | | | | |
|---|---|---|---|---|
| 6,029,195 | A * | 2/2000 | Herz | 725/116 |
| 7,117,439 | B2 | 10/2006 | Barrett et al. | |
| 7,672,894 | B2 * | 3/2010 | Rebane et al. | 705/37 |
| 7,689,458 | B2 * | 3/2010 | Heckerman et al. | 705/14.46 |
| 7,827,060 | B2 * | 11/2010 | Wright et al. | 705/14.4 |
| 7,983,959 | B2 * | 7/2011 | Chickering et al. | 705/26.3 |
| 7,984,466 | B2 | 7/2011 | Eldering et al. | |
| 8,099,326 | B2 * | 1/2012 | Steelberg et al. | 705/14.64 |
| 8,099,328 | B2 * | 1/2012 | Protheroe et al. | 705/14.71 |
| 8,117,067 | B2 * | 2/2012 | Ketchum | 705/14.4 |
| 8,155,990 | B2 * | 4/2012 | Chickering et al. | 705/7.12 |
| 8,160,923 | B2 | 4/2012 | Taylor et al. | |
| 8,271,325 | B2 * | 9/2012 | Silverman et al. | 705/14.1 |
| 8,311,884 | B2 * | 11/2012 | Yang | 705/14.41 |
| 8,311,885 | B2 * | 11/2012 | Kennedy et al. | 705/14.41 |
| 8,412,575 | B2 * | 4/2013 | Labio et al. | 705/14.49 |
| 2006/0095281 | A1 * | 5/2006 | Chickering et al. | 705/1 |
| 2006/0095336 | A1 * | 5/2006 | Heckerman et al. | 705/26 |
| 2006/0106709 | A1 * | 5/2006 | Chickering et al. | 705/37 |
| 2006/0106710 | A1 * | 5/2006 | Meek et al. | 705/37 |
| 2006/0282328 | A1 * | 12/2006 | Gerace et al. | 705/14 |
| 2007/0198327 | A1 | 8/2007 | Yazdani et al. | |
| 2008/0021791 | A1 * | 1/2008 | Steelberg et al. | 705/26 |
| 2008/0103892 | A1 * | 5/2008 | Chatwin et al. | 705/14 |
| 2008/0249832 | A1 * | 10/2008 | Richardson et al. | 705/10 |
| 2008/0250033 | A1 * | 10/2008 | Agarwal et al. | 707/100 |
| 2008/0263578 | A1 * | 10/2008 | Bayer et al. | 725/9 |
| 2009/0094196 | A1 * | 4/2009 | Piwowarski et al. | 707/3 |

(Continued)

OTHER PUBLICATIONS

Wang, Xuerui et al., A Search-based Method for Forecasting Ad Impression in Contextual Advertising WWW2009, Apr. 20-24, 2009.*

(Continued)

*Primary Examiner* — Scott L Jarrett
(74) *Attorney, Agent, or Firm* — Fish & Richardson P.C.

(57) ABSTRACT

Methods, systems, user interfaces, and apparatus, including computer programs encoded on a computer-readable storage medium, for providing performance estimates for a content campaign. A method includes identifying a campaign including one or more targeting criteria for targeting content items to users; identifying historical auction results; storing the historical auction results as a plurality of documents; evaluating the plurality of documents to determine an estimated number of impressions that would occur in the plurality of documents based on the targeting criteria; determining an estimated total number of impressions for the targeting criteria in the time period based at least in part on the estimated number of impressions in the plurality of documents; and determining a total number of unique targeted users including determining a frequency of impression and determining the total number of unique targeted users as the total number of impressions divided by the frequency of impression.

22 Claims, 4 Drawing Sheets

(56) References Cited

U.S. PATENT DOCUMENTS

| | | | |
|---|---|---|---|
| 2009/0119172 A1* | 5/2009 | Soloff | 705/14 |
| 2009/0313120 A1* | 12/2009 | Ketchum | 705/14.51 |
| 2010/0082393 A1* | 4/2010 | Vassilvitskii et al. | 705/8 |
| 2010/0138291 A1* | 6/2010 | Silverman et al. | 705/14.45 |
| 2010/0250332 A1* | 9/2010 | Ghosh et al. | 705/10 |
| 2010/0262499 A1* | 10/2010 | Karlsson et al. | 705/14.72 |
| 2011/0015992 A1* | 1/2011 | Liffiton et al. | 705/14.46 |
| 2011/0035276 A1* | 2/2011 | Ghosh et al. | 705/14.46 |
| 2012/0158456 A1* | 6/2012 | Wang et al. | 705/7.31 |
| 2012/0253945 A1* | 10/2012 | Gao et al. | 705/14.71 |
| 2012/0303464 A1* | 11/2012 | Gorman et al. | 705/14.71 |

OTHER PUBLICATIONS

Cui, Ying et al., Bid Landscpae Forecasting in Online Ad Exchange Marketplace KDD'11, Aug. 21-24, 2011.*

Richardson, Matthew, Predicting Clicks: Estimating the Click-Through Rate for New Ads WWW 2007, May 8-12, 2007.* eMarketing Planning: Accountability and eMetrics—white paper Embellix Software, 2000.*

AdWords Reference Guide Google, 2004.*

Shields, Tom, Inventory Management in Internet Advertising Woodside Fund, Oct. 15, 2001.*

Inventory Manager—Technical Overview OpenAdStream, Jul. 31, 2001.*

'Wikipedia' [online]. "Video advertising," 2010, [retrieved on Nov. 7, 2012]. Retrieved from the Internet: URL:<http://web.archive.org/web/20110226144105/http:/en.wikipedia.org/wiki/Video_advertising> 1 page.

* cited by examiner

SYSTEM AND METHOD FOR ONLINE UNIQUE USERS AND FREQUENCY ESTIMATION FOR ADVERTISEMENTS ON A VIDEO SHARING WEBSITE BASED ON AUCTION HISTORY RESULTS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing performance estimates for a content campaign. The method comprises: identifying a campaign including one or more targeting criteria for targeting content items to users; determining a number of unique users that will be targeted based on the targeting criteria in a predetermined time period including: identifying historical auction results including content served in response to content requests; storing the historical auction results as a plurality of documents, one for each auction result, wherein storing an auction result as a document comprises storing serving criteria and a user identifier for a user that was served a content item based on the auction result; evaluating the plurality of documents including initiating a query on the plurality of documents to determine an estimated number of impressions that would occur in the plurality of documents based on the targeting criteria; determining an estimated total number of impressions for the targeting criteria in the time period based at least in part on the estimated number of impressions in the plurality of documents; and determining a total number of unique targeted users including determining a frequency of impression for a plurality of the users represented in the plurality of documents as a sum of a frequency of impression for a selected number of users divided by the selected number of users and determining the total number of unique targeted users as the total number of impressions divided by the frequency of impression.

These and other implementations can each optionally include one or more of the following features. The targeting criteria for targeting content items can be selected from the group comprising keywords, URLs, verticals, topics, placements, user signals, or a combination thereof. Determining the total number of unique targeted users can include determining a total number of predicted impressions for the historical auction results and a frequency at which documents satisfy the targeting criteria in the historical auction results, and determining a number of unique users as the total number of predicted impressions divided by the frequency at which documents satisfy the targeting criteria in the historical auction results. The method can include identifying a number of documents that are required to produce a query result and determining the estimated total number of impressions can include determining a number of unique users that are determined when evaluating the plurality of documents in order to satisfy the number of documents. Determining the frequency can include determining a frequency for each of the unique users which are associated with one or more documents. Determining the frequency can include determining an average frequency for the unique users. The method can include storing the plurality of documents in a repository. Determining the number of unique users that will be targeted based on the targeting criteria in the predetermined time period can include initiating a first query and one or more second queries on the repository. The first query can be initiated on a beginning of the plurality of documents in the repository. At least one second query can be initiated on an entry in the repository that is located after where the first query terminated. At least one second query can be initiated on an entry in the repository where the first query terminated. At least one second query can be initiated from a beginning of the plurality of documents in the repository. The first query can be a query to determine a number of unique users that are associated with documents that satisfy the targeting criteria. The first query can be a query to determine a number of unique users that are associated with documents that satisfy the targeting criteria in a subset of the repository. At least one second query can be a query to determine a number of unique users by querying the repository to determine a frequency of impression for some or all users represented in the repository. The estimated total number of impressions can be determined as an extrapolation based on a number of historical auctions that are evaluated as compared to a total number of auctions that are conducted in a time period. The campaign can be associated with a video content item. The method can include providing the total number of unique targeted users to a campaign sponsor. Providing the total number of unique targeted users can include providing the total number of unique targeted users to a campaign sponsor in response to selection or designation of the targeting criteria. Providing the total number of unique targeted users can happen in substantially real time. The method can include providing to the campaign sponsor an estimate of the number of views of the video content item in the predetermined time period. The serving criteria can include bid information indicating a winning bid amount for an auction.

In general, another innovative aspect of the subject matter described in this specification can be implemented in user interfaces. A user interface includes a set of one or more targeting criteria controls for configuring targeting criteria for targeting content items for a campaign; a first output control configured to display an estimated total number of impressions for the targeting criteria in a predetermined time period; and a second output control configured to display a number of unique users that will be targeted based on the targeting criteria in the predetermined time period. The estimated total number of impressions is determined based at least in part on a first query on historical auction results stored as a plurality of documents, and the first query determines an estimated number of impressions that would occur in the plurality of documents based on the targeting criteria. The total number of unique targeted users is determined by dividing the estimated total number of impressions by an estimated frequency of impression, wherein the estimated frequency of impression is a sum of a frequency of impression for a selected number of users represented in the plurality of documents divided by the selected number of users.

These and other implementations can each optionally include one or more of the following features. The estimated total number of users can be determined based at least in part by dividing a total number of predicted impressions for the historical auction results by a frequency at which documents satisfy the targeting criteria in the historical auction results. The campaign can be associated with a video content item and the second output control can be configured to display the total number of unique targeted users to a campaign sponsor. The user interface can include a third output control configured to display to the campaign sponsor an estimate of the number of views of the video content item in the predetermined time period.

In general, another innovative aspect of the subject matter described in this specification can be implemented in computer program products. A computer program product tangibly embodied in a computer-readable storage device and comprises instructions that, when executed by a processor, cause the processor to: identify a campaign including one or more targeting criteria for targeting content items to users; determine a number of unique users that will be targeted based on the targeting criteria in a predetermined time period including: identifying historical auction results including content served in response to content requests; storing the historical auction results as a plurality of documents, one for each auction result, wherein storing an auction result as a document comprises storing serving criteria and a user identifier for a user that was served a content item based on the auction result; evaluating the plurality of documents including initiating a query on the plurality of documents to determine an estimated number of impressions that would occur in the plurality of documents based on the targeting criteria; determining an estimated total number of impressions for the targeting criteria in the time period based at least in part on the estimated number of impressions in the plurality of documents; and determining a total number of unique targeted users including determining a frequency of impression for a plurality of the users represented in the plurality of documents as a sum of a frequency of impression for a selected number of users divided by the selected number of users and determining the total number of unique targeted users as the total number of impressions divided by the frequency of impression.

These and other implementations can each optionally include one or more of the following features. Determining the total number of unique targeted users can include determining a total number of predicted impressions for the historical results and a frequency at which documents satisfy the targeting criteria in the historical results, and determining a number of unique users as the total number of predicted impressions divided by the frequency at which documents satisfy the targeting criteria in the historical auction results. The campaign can be associated with a video content item and the instructions can include instructions to provide the total number of unique targeted users to a campaign sponsor. The computer program can include instructions to provide to the campaign sponsor an estimate of the number of views of the video content item in the predetermined time period.

Particular implementations may realize one or more of the following advantages. A campaign sponsor can be presented, in substantially real time, an estimate of the total number of unique users that will be targeted by a campaign. A campaign sponsor can be presented, in substantially real time, an updated estimate of the total number of users targeted by a campaign, in response to the campaign sponsor changing targeting criteria for the campaign.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A content campaign (e.g., an advertising campaign, such as a campaign that includes video advertisements) can be defined by campaign parameters, such as a campaign name, a preferred content network for placing content, a budget for the campaign, start and end dates for the campaign, a schedule for content placements, and targeting criteria. A campaign sponsor can configure campaign parameters for the content campaign. The campaign sponsor may desire to know how many unique users may be targeted by the campaign in a particular time period. A content management system can estimate the number of unique users targeted by the campaign using an approach that can provide an estimate in real time or near real time (e.g., within a second or a few seconds). For example, the content management system can identify historical auction results that include content served in response to content requests and can store the historical results as a set of documents, where each document includes information about a respective auction. The content management system can evaluate the set of documents to determine an estimated number of impressions associated with the documents, extrapolate to determine a total number of impressions estimate for the targeting criteria for the time period, and determine a total number of unique targeted users using the total number of impressions estimate.

For situations in which the systems discussed here collect information about users (such as content items served to a user, user list information), the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined.

Figure 1:
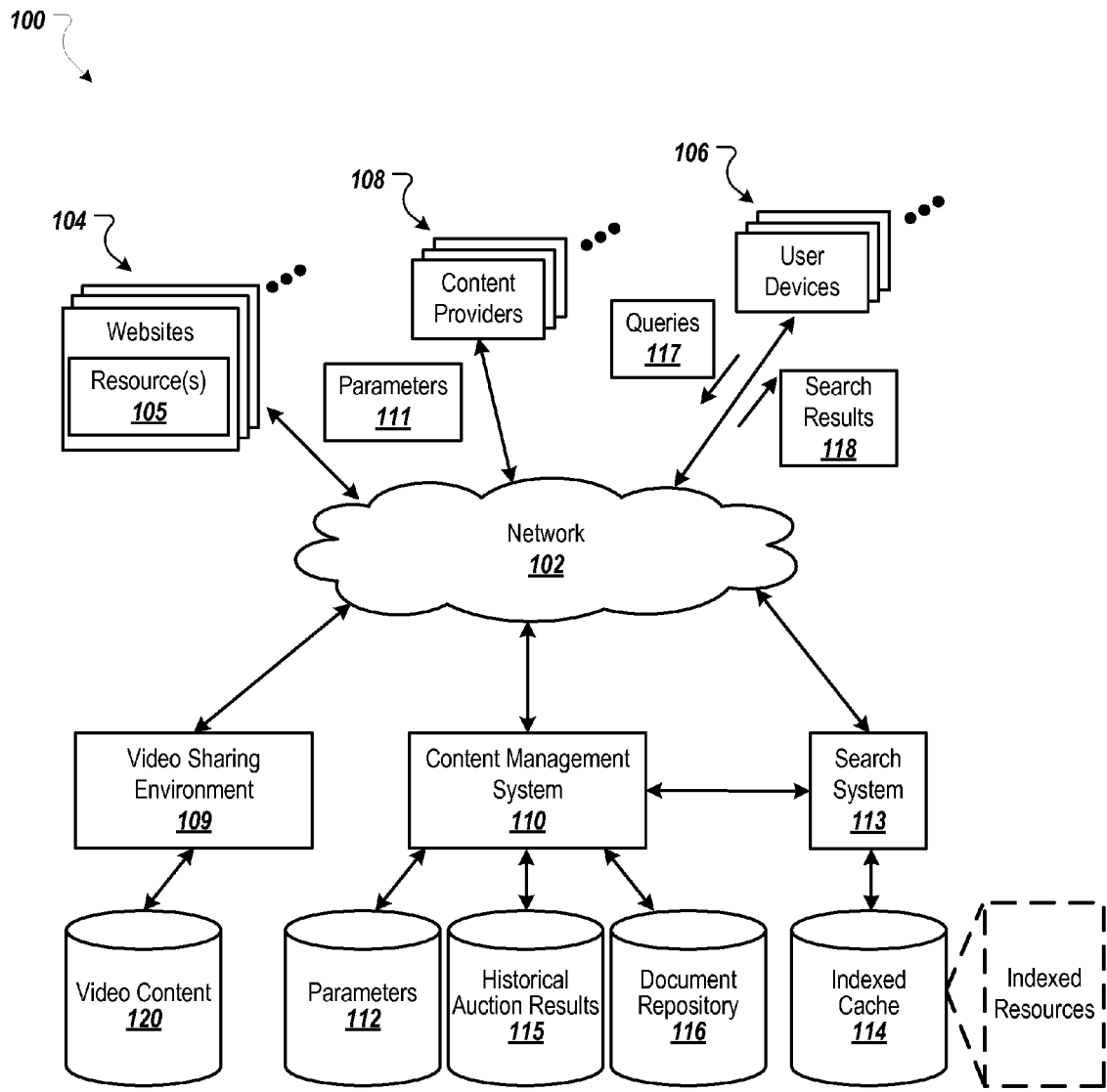
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers, a video sharing environment 109, and a content management system 110. The example environment 100 may include many thousands of websites 104, user devices 106, and content providers 108. The content management system 110 may be used for selecting and providing content in response to requests for content. The content providers 108 can be, for example, advertisers. Other types of content providers are possible.

A content provider 108 or campaign sponsor can create a content campaign associated with one or more video content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device. The content provider 108 can create, for example, a video campaign or some other type of campaign.

The content provider 108 can, using the account management user interfaces, provide campaign parameters 111 which define the content campaign. The campaign parameters 111 can be stored in a parameters data store 112. Campaign parameters 111 can include, for example, a campaign name, a preferred content network for placing content, a budget for the campaign, start and end dates for the campaign, a schedule for content placements, content (e.g., a creative, such as video content to be made available on the video sharing environment 109), bids for one or more content items, and targeting criteria. Targeting criteria can include, for example, a targeted language, one or more targeted geographical locations or websites, one or more targeted verticals, one or more networks on which to provide content, and/or one or more targeting terms. The content campaign can be created and activated for the content provider 108 according to the parameters 111 specified by the content provider 108.

The content provider 108 can experiment with different campaign parameters 111 to identify particular campaign parameters 111 that meet one or more performance goals identified by the content provider 108. For example, the content provider 108 may identify a goal of targeting a particular number (e.g., ten thousand) of unique users with the campaign and/or having the campaign result in a particular number (e.g., one hundred thousand) of impressions. The content provider 108 can, using an account management interface, specify a particular time period and particular targeting criteria and the content management system 110 can determine an estimated number of unique users targeted by the campaign during the time period in response to selection or designation of the targeting criteria by the content provider 108. The content management system 110 can determine the total number of unique users estimate in real time or near real time (e.g., within a second or a few seconds). Accordingly, the account management user interface used by the content provider can be responsive to the content provider 108, providing estimates to the content provider 108 and allowing the content provider 108 to experiment with different targeting criteria until the number of unique users estimate (and/or the number of impressions estimate) is satisfactory to the content provider 108.

The content management system 110 can identify historical auction results 115 that include information regarding historical auctions previously conducted by the content management system 110 in response to the content management system 110 receiving content requests. The content management system 110 can store, for each identified auction result, some or all of the information for each identified auction result in a document and can store each document in a documents repository 116. For example, each document can include serving criteria and a user identifier of a user that was served a content item based on the associated auction. The content management system 110 can store a document in the documents repository 116 for a subset of the historical auction results 115. For example, the documents repository 116 can include documents which correspond to one percent of the users for which information is stored in the historical auction results 115.

To estimate the number of unique users for the targeting criteria and the time period specified by the content provider 108, the content management system 110 can evaluate documents in the document repository 116. For example, the content management system 110 can process a subset of the documents in the document repository 116 and can estimate a number of impressions that would occur in the documents in the documents repository 116 based on the processing of the subset. The content management system 110 can determine an estimated total number of impressions for the specified targeting criteria in the specified time period based at least in part on the estimated number of impressions that would occur in the documents in the document repository 116 (e.g., the estimated total number of impressions can be determined using extrapolation).

The content management system 110 can determine an estimate of the total number of unique users that will be targeted based on the specified targeting criteria in the specified time period using the determined estimated total number of impressions. For example, the content management system 110 can determine an average frequency of impression and can determine the total number of unique users as the total number of impressions divided by the average frequency of impression. Determining the total number of impressions, the average frequency of impression, and the total number of unique users is described in more detail below with respect to FIGS. 2 and 3.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as JavaScript scripts).

To facilitate searching of resources 105, the environment 100 can include a search system 113 that identifies the resources 105 by crawling and indexing the resources 105 provided by the content publishers on the websites 104. Data about the resources 105 can be indexed based on the resource 105 to which the data corresponds. The indexed and, optionally, cached copies of the resources 105 can be stored in an indexed cache 114.

A user device 106 is an electronic device that is under control of a user and is capable of requesting and receiving resources 105 over the network 102. Example user devices 106 include personal computers, tablet computers, mobile communication devices (e.g., smartphones), televisions, and other devices that can send and receive data over the network 102. A user device 106 typically includes one or more user applications, such as a web browser, to facilitate the sending and receiving of data over the network 102.

The video sharing environment 109 allows users, using the user devices 106, and content providers 108 to upload and make available video content items. The video sharing environment 109 may include, for example, multiple channels, where each channel may be associated, for example, with one or more content providers 108, one or more particular users, or a particular type of video content. The content provider 108 can, for example, associate one or more targeting keywords with each video content item that is included in a video campaign. As another example, the content provider 108 can associate a video content item in a video campaign with one or more user video content items that are stored in a repository 120 (e.g., the video content item may be a video advertisement that is associated with one or more user video content items).

A user device 106 can, for example, request resources 105 from a website 104. In turn, data representing the resource 105 can be provided to the user device 106 for presentation by the user device 106. As another example, a user device 106 can request a video content item hosted by the video sharing environment 109. As yet another example, user devices 106 can submit search queries 117 to the search system 113 over the network 102.

In response to a search query 117, the search system 113 can access the indexed cache 114 to identify resources 105 that are relevant to the search query 117. The search system 113 identifies the resources 105 in the form of search results 118 and returns the search results 118 to the user devices 106 in one or more search results pages. In some implementations, a search result 118 is data generated by the search system 113 that identifies a resource 105 that is responsive to a particular search query 117, and includes a link to the resource 105. An example search result 118 can include a web page title or video title, a snippet of text or a portion of an image extracted from the web page or video, and the URL (Unified Resource Location) of the web page.

A request for content can be received by the content management system 110 from a user device 106. The request for content can be associated with, for example, a request for a resource 105, a search query 117, or request for a particular video content item. The content management system 110 can select one or more additional content items to provide in response to the request. For example, the request for content can include characteristics (e.g., size, supported media types) of one or more content "slots" that are defined for the requested resource 105 or search results page. As another example, resource keywords associated with a requested resource 105 or a search query 117 can be provided to the content management system 110. Content items selected by the content management system 110 can include video content items or other content items having characteristics matching the characteristics of content slots and that are identified as relevant to specified resource keywords or search queries 117. For example, content items having targeting keywords that match the resource keywords or the search query 117 can be selected by the content management system 110. The content management system 110 can also select content items at least in part based on the results of an auction.

Figure 2:
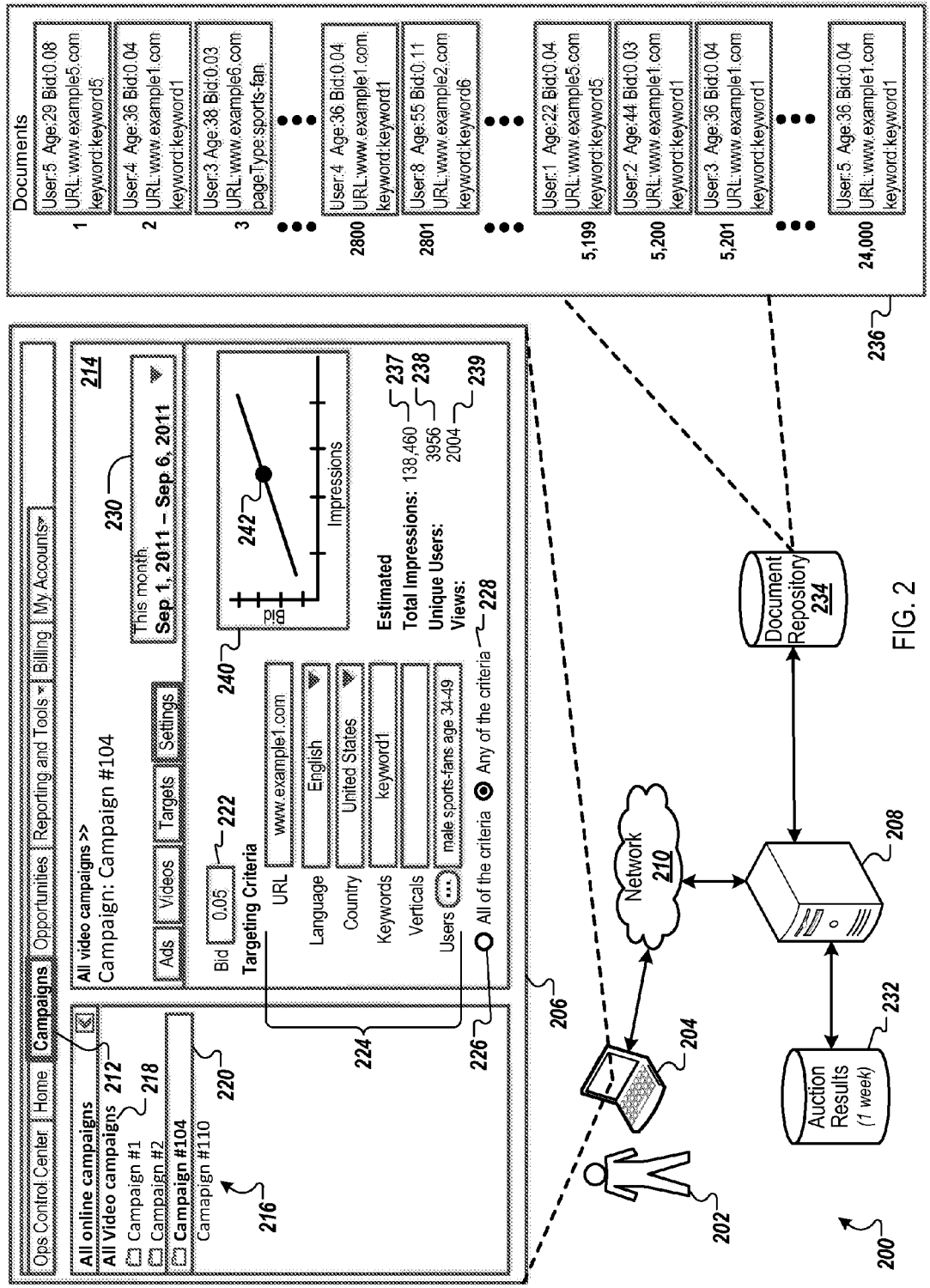
FIG. 2 illustrates an example system for managing a content campaign.

FIG. 2 illustrates an example system 200 for managing a content campaign. A campaign sponsor 202 can use a client device 204 to display an example campaign management user interface 206 provided by a content management system 208. For example, the content management system 208 can provide the campaign management user interface 206 over a network 210. The campaign management user interface 206 can be included, for example, in one or more user interfaces that the campaign sponsor 202 can use to configure a campaign, such as a video campaign. The campaign sponsor 202 can select a tab 212 to display a campaign area 214. The campaign sponsor 202 can view a list 216 of video campaigns by selecting a control 218. The campaign sponsor 202 can edit an existing video campaign in the campaign area 214 by selecting the name of an existing campaign (e.g., a name 220) in the video campaign list 216.

The content sponsor 202 can, using the campaign management user interface 206, specify a bid using a control 222. For example, the bid may be a "CPM" (Cost Per Mille) bid, or a bid for one thousand impressions for a particular video content item that is included in the selected campaign. The campaign sponsor 202 can specify targeting criteria 224, for example, a URL of "www.example1.com", a language of English, a country of the United States, a keyword of "keyword1", and user characteristics of male, sports-fan, and age thirty four to forty nine.

In general, the targeting criteria 224 can include, for example, one or more URLs (Uniform Resource Locators) of web sites to target, a language, a country, region, or other location, one or more keywords, one or more verticals, and one or more user targeting criteria. User targeting criteria can include for example, age, gender, and user-list information, such as whether a user is included in one or more user lists, such as a user list associated with a particular user interest (e.g., sports). Other types of targeting criteria can be specified, such as one or more topics, one or more networks on which to place content items, or placement of content items, to name a few examples. The campaign sponsor 202 can select a control 226 to indicate that the campaign sponsor 202 is interested in satisfying all of the targeting criteria 224 or can select a control 228 to indicate that the campaign sponsor 202 is interested in satisfying at least one of the targeting criteria 224.

The campaign sponsor 202 can select a time period using a control 230. In response to the campaign sponsor 202 selecting a time period and selecting or designating the targeting criteria 224, the content management system 208 can determine an estimate of the number of unique users that will be targeted based on the targeting criteria 224 in the specified time period. For example, the content management system 208 can identify historical auction results that are included in an auction results repository 232. Each of the historical auction results can include information associated with an auction result corresponding to a previous serving of content by the content management system 208 in response to a content request. The auction results repository 232 can be maintained, for example, to include auction results from the previous week. In some implementations, the content management system 208 identifies a subset of the historical auction results included in the auction results repository 232. For example, the content management system 208 can identify historical auction results in the auction results repository 232 that are associated with one percent of users for which auction results are stored in the auction results repository 232.

The content management system 208 can store a document for each of the identified historical auction results in a document repository 234. Each of the documents in the document repository 234 can include serving criteria and a user identifier for a user that was served a content item based on the auction. The serving criteria can include, for example, information about keywords, formats, URLs, verticals, topics, placements, user signals, bid information, and information about networks on which to serve content. For example, as shown in example documents 236, a document with document number "1" (e.g., the document "1") includes a user identifier of "5", a user age of "29" (in cases when the user provides such information and consents to its use), a bid amount of "0.08", a URL of "www.example5.com", and a keyword of "keyword5". As another example, the example documents 236 include a document "2" that includes a user identifier of "4", a user age of "36", a bid amount of "0.04", a URL of "www.example1.com", and a keyword of "keyword1". The document "1" and the document "2" can include other serving criteria.

In some implementations, the serving criteria that is stored in a document is based on a network on which the served content associated with the document was served. For example, the document "2", which may correspond to content that was served on a video sharing network, includes the keyword "keyword1" while a document "3", which may have been served on a display network, does not include keyword information, but does include a classification (e.g., "sportsfan") which describes a type of web page that the content was served on.

The user signals can include, for example, age, gender, location, and/or user list membership information (e.g., information about membership in a list of users who appear to be interested in a particular web site, or a particular type of content, such as sports), as authorized by the user. Bid information can include information indicating a winning bid amount for the auction associated with the document.

In some implementations, one or more indices can be associated with the documents 236. For example, in some implementations, an index is associated with the documents 236 for each type of serving criteria. For example, a first index associated with keywords and a second index associated with URLs can each be associated with the documents 236. The content management system 208 can perform a query on the documents 236 using one or more of the indices.

For example, the content management system 208 can evaluate the documents 236 to determine an estimated number of impressions that would occur in the plurality of documents based on the targeting criteria 224 and the time period specified by the campaign sponsor 202. The content management system 208 can initiate a query from the beginning of the documents 236 and can identify documents that include serving criteria that match the targeting criteria 224 and that have a bid that is less than (or in some implementations, less than or equal to) the bid specified using the bid control 222. For example, the content management system can determine that the documents "2" and "3" include serving criteria that match the targeting criteria 224 and have a bid amount that is less than the specified bid.

In some implementations, the content management system 208 can use multiple indices (e.g., one index per type of targeting criteria) to evaluate the documents 236. For example, the content management system can use a first index to determine a first set of matching documents, a second index to determine a second set of matching documents, and can determine an overall set of matching documents by determining an overlap between the first set of documents and the second set of documents. In some implementations, the content management system 208 uses multiple indices in parallel. The content management system 208 may perform one type of processing (e.g., "AND" logic processing) if the campaign sponsor 202 selects the control 226 and may perform another type of processing (e.g., "OR" logic processing) if the campaign sponsor 202 selects the control 228.

In some implementations, the content management system 208 can query the documents 236 from the beginning of the documents 236 until a predetermined number of documents that match the targeting criteria 224 and have a bid amount that is less than the specified bid are identified. The content management system 208 can extrapolate to determine an estimated number of impressions that would occur in the documents 236 based on the specified bid and the specified targeting criteria. For example, the content management system 208 can evaluate the documents 236 until three hundred matching documents have been identified. For example, a document "5,200" may be the $300^{th}$ matching document.

The content management system 208 can determine which percentage of the documents from the document "1" to the document "5,200" are matching documents (e.g., 300/5200, or 5.77%). The content management system 208 can determine an estimated number of matching documents in the documents 236 by multiplying the determined percentage by the total number of documents in the documents 236 (e.g., 5.77%*24,000 documents, resulting in an estimate of 1385 matching documents, or an estimated 1385 impressions that would occur in the documents 236 based on the specified bid and the specified targeting criteria). Such an extrapolation approach can be used to determine an estimate since the documents 236 can be randomly ordered (e.g., no particular user, no particular targeting criteria, etc. is grouped in the documents 236 (e.g., since grouping may skew an estimate performed using extrapolation)).

The content management system 208 can determine an estimated total number of impressions for the specified targeting criteria in the specified time period based at least in part on the estimated number of impressions that would occur in the documents 236. For example, suppose the documents 236 include documents associated with auction results for one percent of the users for which auction results are stored in the auction results repository 232. The content management system 208 can determine an estimated total number of impressions by multiplying the estimate of matching documents that would occur in the documents 236 by one hundred, or, in the example of FIG. 2, a total estimated number of impressions of 138,460. In some implementations, the rounded estimated number of documents value of 1385 is used rather than an unrounded estimated number of documents, which can result in a total estimated number of impressions of 138,500.

The content management system 208 can determine an estimated number of unique users that will be targeted based on the specified targeting criteria in the specified time period using the estimated total number of impressions. For example, the content management system 208 can determine an estimated average frequency for some or all of the users for which documents are stored in the documents 236 and can determine the estimated number of unique users by dividing the estimated total number of impressions by the average frequency. For example, the content management system 208 can determine a frequency of impression in the documents 236 for selected users "2", "3", and "4". That is, a number of matching documents associated with each of the selected users "2", "3", and "4" can be determined or estimated.

In some implementations, all of the documents 236 are processed to determine the frequencies for each of the selected users "2", "3", and "4". In some implementations, a subset of the documents 236 are processed for some or all of the selected users "2", "3", and "4", to determine a frequency for one or more particular respective users. For example, to determine a frequency for a particular user, the documents 236 can be processed until a threshold number of matching documents that are associated with the user are reached. For example, a document "2800" associated with the user "4" may be the tenth matching document associated with the user "4". In the subset of the twenty eight hundred processed documents, ten out of the twenty eight hundred, or 0.36% of the processed documents, are matching documents associated with the user "4". A frequency for the user "4" for all of the documents 236 can be estimated by multiplying the 0.36% times the total number of documents (e.g., 0.36%*24,000, resulting in a frequency estimate of eighty six for the user "4".

In some implementations, processing to determine frequency estimates for each of the selected users "2", "3", and "4" can be performed in parallel, and once a number of matching documents associated with a particular user are determined, processing for that particular user can stop and processing for the other users can continue, until frequency estimates have been determined for each of the selected users.

An average frequency can be determined based on the frequencies determined for the selected users. For example, suppose that in addition to the frequency estimate of eighty six for the user "4", frequency estimates of sixteen and three have been determined for the users "2", and "3", respectively. An average frequency for the selected users can be determined by summing the determined selected user estimated frequencies and dividing by the number of selected users (e.g., 86+16+3/3, for an average frequency of thirty five).

An estimated number of unique users can be determined by dividing the estimated total number of impressions by the average frequency. For instance, in the example of FIG. 2, the estimated number of unique users that may be targeted based on the specified targeting criteria in the specified time period can be determined as 138,460 divided by thirty five, or three thousand nine hundred fifty six unique users. The content management system 208 can display the estimated total number of impressions and the estimated number of unique users to the campaign sponsor 202, such as in controls 237 and 238, respectively.

As described above, the content management system 208 can determine the estimated total number of impressions and the number of unique users by processing a subset of the documents 236, which are associated with a subset of the historical auction results stored in the auction results repository 232. The content management system 208 can provide these estimates in a timely, responsive manner to the campaign sponsor 202 on the campaign management user interface 206. Other approaches, which may involve processing all of the historical auction results in the auction results repository 232, and/or all of the documents 236, or re-running some or all auctions, can result in a response time that is unsatisfactory to the campaign sponsor 202.

In some implementations, the content management system 208 can, for campaigns that include video content items, determine an estimated number of views, as shown in a control 239. For some types of video content item formats, a view is considered different than an impression. For example, for a pre-roll video content item, it can be considered that the user views the video content item if the user does not skip the video content item before completion of the video content item. As another example, for a thumbnail video content item, it can be considered that the user views the video content item if the user selects the thumbnail video content item (whereas if the user does not select the thumbnail video content item, it can be considered that an impression, but not a view, of the thumbnail video content item occurred).

In some implementations, information indicating whether a user viewed a video content item is stored in the documents 236 that are associated with video content items and a number of views estimate can be determined by processing such information. In some implementations, a number of views estimate can be determined based on the format of the video content item. For example, a predetermined estimated view rate for a particular video content item format can be used to estimate a number of views.

In some implementations, a range of values may be displayed in some or all of the controls 237, 238, and 239. For example, a range of values may be shown to prevent a user from being able to enter extremely specific targeting information as the targeting criteria 224 to determine information about particular users. In some implementations, a range of values may be shown in some or all of the controls 237, 238, or 239 if less than a threshold number of users (e.g., one thousand) are identified for which documents matching the targeting criteria 224 are stored in the document repository 234. For example, a range of values may be shown, or a message indicating an estimate cannot be obtained, if matching documents included in the document repository 234 are associated with only one or two users.

In some implementations, in addition to providing the estimated total number of impressions and the estimated number of unique users, the content management system 208 can also display a bid landscape graph 240, which illustrates an estimated number of impressions that the campaign sponsor 202 can obtain by specifying various bid amounts. A marker 242 can correspond to the current bid displayed in the control 222. In some implementations, the bid landscape graph 240 can display similar information for views and/or for unique users. The content management system 208 can determine information used to display the bid landscape graph 240 by evaluating some or all of the documents 236. The content management system 208 can determine information used to display the bid landscape graph 240 by performing processing in parallel with determining the estimated total number of impressions and the estimated number of unique users, or in processing that is separate from processing for determining those estimates.

Other features can be included in the campaign management user interface 206. For example, in implementations where the targeting criteria 224 includes networks on which to serve content, separate estimated total number of impressions and estimated number of users can be displayed for each network. As another example, the content management system 208 can recommend a particular bid amount to maximize estimated total number of impressions and/or number of unique users, in light of a specified budget.

In some implementations, the content management system 208 can perform one or more optimizations when determining the total estimated number of impressions and/or the estimated number of users. For example, as described above, the content management system 208 can stop a first stage of processing (e.g., a stage to determine the number of impressions that would occur in the documents 236) at document "5200" after identifying a predetermined number (e.g., 300) of documents that match the targeting criteria 224 and have a bid amount that is less than the specified bid. The content management system 208 can resume further processing (e.g., in a stage two, to determine a frequency of one or more users) at a document "5201", rather than beginning such further processing at the document "1". For example, while performing the first stage of processing, the content management system 208 can cache information needed for the second stage of processing. As another example, as mentioned, the content management system 208 can perform processing for multiple users in parallel, such as when determining frequency estimates for multiple users. The content management system 208 can, over time, perform analysis to determine a number of users for which to estimate frequency, with a goal of reducing the number of users for which to obtain frequency estimates. In some implementations, some or all of the users used in the stage one processing can be selected as users for the stage two processing, and the stage two processing can be initiated immediately after the stage one processing (e.g., at the document "5201" in the example above).

Figure 3:
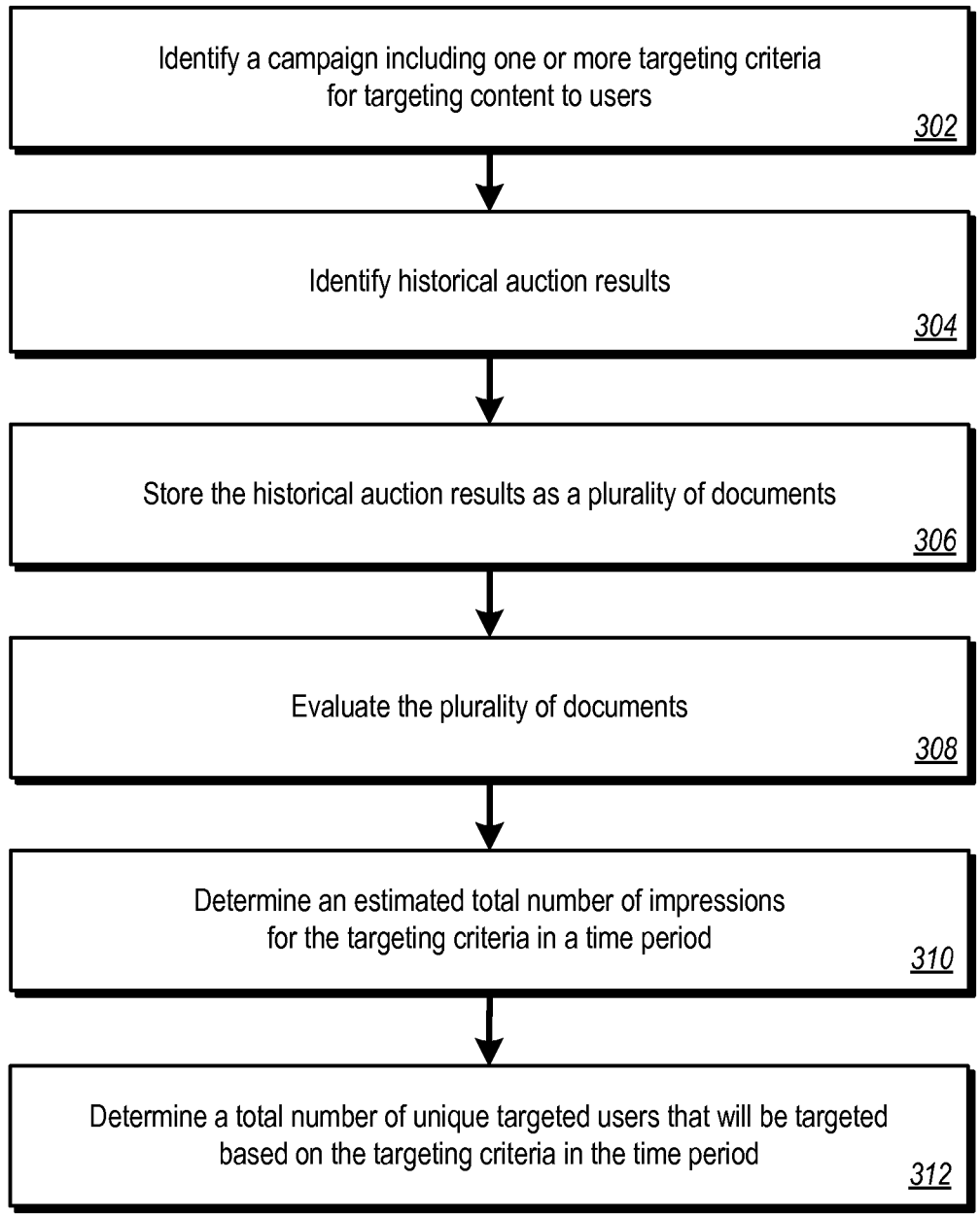
FIG. 3 is a flowchart of an example process for providing performance estimates for a content campaign.

FIG. 3 is a flowchart of an example process 300 for providing performance estimates for a content campaign. The process 300 can be performed, for example, by the content management system 110 described above with respect to FIG. 1 or the content management system 208 described above with respect to FIG. 2.

A campaign including one or more targeting criteria for targeting content items to users is identified (302). For example, a campaign sponsor can provide user input to create or edit a campaign using a campaign management user interface provided by the content management system 110. The campaign can be, for example, a video campaign or some other type of campaign.

Historical auction results are identified (304). For example, the content management system 110 can identify historical auction results associated with auctions occurring during a predetermined time period. For example, historical auction results, including content served in response to content requests, from the previous week can be identified. A full week of historical auction results can be identified, for example, so that both weekend and weekday auction results are included in the identified historical auction results.

In some implementations, a subset of the historical auction results occurring in the predetermined time period is identified. For example, historical auction results that are associated with one percent of the users for which auctions were performed during the predetermined time period can be identified. For example, if user identifiers associated with the historical auction results are numeric values, historical auction results that are associated with one percent of the users can be identified by identifying historical auction results that have an associated user identifier ending in a particular two digit value. For example, a random two digit value can be determined (e.g., "38"), and all historical auction results that have associated user identifiers that end with the random two digit value (e.g., user identifiers "123438", "445638") can be identified, where the identified historical auction results can be an approximation of historical auction results that are associated with one percent of the users for which auctions were performed during the predetermined time period. In some implementations, the percentage of users for which auction results are identified is based on a country or region included in the targeting criteria. For example, a larger percentage of users may be identified for a country or region that has previously been identified as less homogenous or consistent in terms of user demographics or user behavior as compared to other countries or regions.

The historical results are stored as a plurality of documents (306), one document for each auction, where storing an auction as a document includes storing serving criteria and a user identifier for a user that was served the content item based on the auction. A document can be, for example, one or more records in a database, a file, a part of a file, or a set of files, or some other type of structure for storing data. The documents can be stored, for example, in a repository (e.g., the document repository 234, described above with respect to FIG. 2). The user identifier can be, for example, a cookie or some other type of user identifier. The serving criteria can include, for example, information about keywords, formats, URLs, verticals, topics, placements, user signals, bid information, and information about networks on which to serve content. The user signals can include, for example, age, gender, location, and user list membership information (e.g., information about membership in a list of users who appear to be interested in a particular web site, or a particular type of content, such as sports), as authorized by the user. Bid information can include information indicating a winning bid amount for the auction associated with the document. In some implementations, one or more indices can be associated with the documents. For example, in some implementations, an index is associated with the documents for each type of serving criteria. For example, a first index associated with verticals and a second index associated with URLs can each be associated with the documents. The documents are stored, for example, such that documents can be retrieved quickly based on one or more index values provided by a query.

The plurality of documents is evaluated (308). For example, the content management system can perform one or more queries. A query can include, for example, one or more index values, and document(s) that match the one or more index values can be retrieved. For example, a query can be initiated from a beginning of the plurality of documents to determine an estimated number of impressions that would occur in the plurality of documents based on the targeting criteria. The content management system 110 can process the documents to identify documents that include serving criteria that match the targeting criteria. In some implementations, the content management system can process the documents until a predetermined number of matching documents are identified. The content management system 110 can determine a percentage of the processed documents as matching documents and can extrapolate to determine the estimated number of impressions that would occur in the plurality of documents based on the targeting criteria.

An estimated total number of impressions for the targeting criteria in the time period is determined, based at least in part on the estimated number of impressions in the plurality of documents (310). For example, the estimated total number of impressions can be determined as an extrapolation based on a number of historical auctions that are evaluated as compared to a total number of auctions that are conducted in a time period associated with the historical auction results. As a particular example, suppose that the estimated number of impressions in the plurality of documents is determined to be ten thousand. Suppose also that the plurality of documents is associated with one percent of the users for which auction results are stored. An estimated total number of impressions can be determined to be ten thousand divided by one percent, or one million.

A total number of unique targeted users that will be targeted based on the targeting criteria in the time period is determined (312). For example, a frequency of impression can be determined for a plurality of the users represented in the plurality of documents as a sum of a frequency of impression for the plurality of users divided by a number of users. The total number of unique targeted users can be determined as the total number of impressions divided by the frequency of impression. In some implementations, a frequency for each of the unique users that are associated with one or more documents is determined. In some implementations, a frequency is determined for a subset of the users represented in the plurality of documents. For example, as described above, suppose the estimated total number of impressions is determined to be one million and suppose that the average frequency for ten identified users for which information is stored in the documents is estimated to be twenty. The estimated number of users can be determined to be one million divided by twenty, or fifty thousand. The estimated number of users can be presented to the campaign sponsor, such as on the campaign management user interface.

In some implementations, determining the number of unique users that will be targeted based on the targeting criteria in the predetermined time period includes initiating a first query and one or more second queries on the document repository (e.g., the document repository 234). For example, the first query can be a query to determine the estimated number of impressions that would occur in the documents based on the targeting criteria. As another example, the first query can be a query to determine a number of unique users that are associated with documents that satisfy the targeting criteria. As yet another example, the first query can be a query to determine a number of unique users that are associated with documents that satisfy the targeting criteria in a first subset of the document repository.

One or more of the second queries can be a query to determine a number of unique users by querying the repository to determine a frequency of impression for users for the targeting criteria in the repository. The first query can be initiated at the beginning of the documents in the repository. In some implementations, at least one second query can be initiated also from the beginning of the documents in the repository. As another example, in some implementations at least one second query can be initiated on or just after an entry in the repository where the first query terminated.

Figure 4:
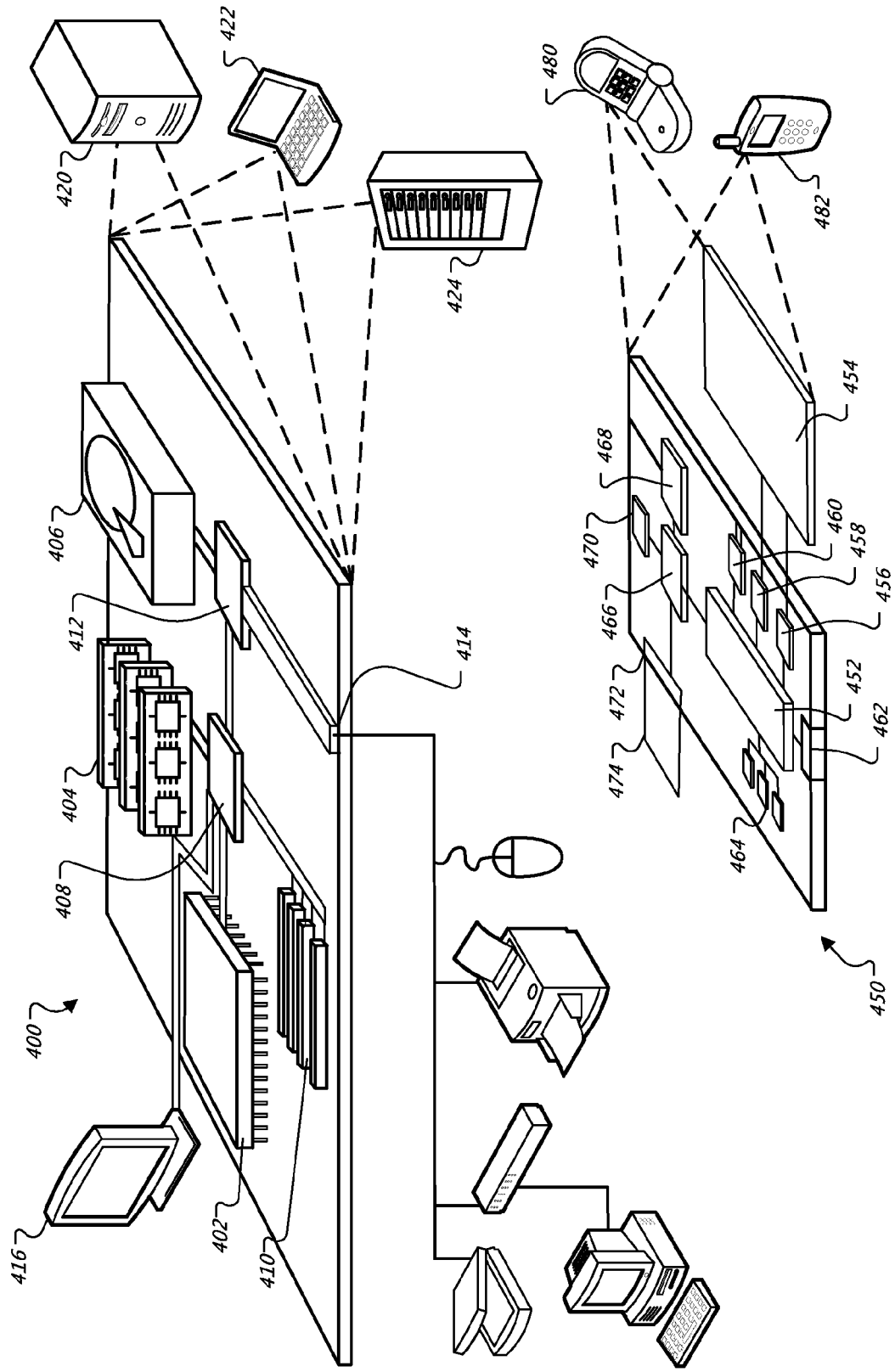
FIG. 4 is a block diagram of computing devices that may be used to implement the systems and methods described in this disclosure, as either a client or as a server or plurality of servers.

FIG. 4 is a block diagram of computing devices 400, 450 that may be used to implement the systems and methods described in this disclosure, as either a client or as a server or a plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/ or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communication audibly using audio codec 460, which may receive spoken information from a user and convert it to usable digital information. Audio codex 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A computer implemented method comprising:
identifying a campaign including one or more targeting criteria for targeting content items to users;
determining, by one or more processors, a number of unique users that will be targeted based on the targeting criteria in a predetermined time period including:
identifying historical auction results including content served in response to content requests;
storing the historical auction results as a plurality of documents, one for each auction result, wherein storing an auction result as a document comprises storing serving criteria and a user identifier for a user that was served a content item based on the auction result;
evaluating the plurality of documents including initiating a first query on the plurality of documents to determine an estimated number of impressions that would occur in the plurality of documents based on the targeting criteria including generating a first count for occurrences in the plurality of documents that satisfy the first query including identifying a location in the plurality of documents wherein the first count satisfies a first threshold number of occurrences;
determining an estimated total number of impressions for the targeting criteria in the time period based at least in part on the estimated number of impressions in the plurality of documents; and
determining a total number of unique targeted users including initiating a second query starting at a next entry after the location in the plurality of documents including estimating the number of unique users for the targeting criteria based on the second query including determining a frequency of impression for a plurality of the users represented in the plurality of documents as a sum of a frequency of impression for a selected number of users divided by the selected number of users and determining the total number of unique targeted users as the total number of impressions divided by the frequency of impression.

2. The method of claim 1 wherein the targeting criteria for targeting content items are selected from the group comprising keywords, URLs, verticals, topics, placements, user signals, or a combination thereof.

3. The method of claim 1 wherein determining the total number of unique targeted users includes determining a total number of predicted impressions for the historical auction results and a frequency at which documents satisfy the targeting criteria in the historical auction results, and determining a number of unique users as the total number of predicted impressions divided by the frequency at which documents satisfy the targeting criteria in the historical auction results.

4. The method of claim 1 further comprising identifying a number of documents that are required to produce a first query result and wherein determining the estimated total number of impressions includes determining a number of unique users that are determined when evaluating the plurality of documents in order to satisfy the number of documents.

5. The method of claim 4, wherein determining the frequency includes determining a frequency for each of the unique users which are associated with one or more documents.

6. The method of claim 5 wherein determining the frequency includes determining an average frequency for the unique users.

7. The method of claim 1 further comprising storing the plurality of documents in a repository.

8. The method of claim 1 wherein the first query is initiated on a beginning of the plurality of documents in the repository.

9. The method of claim 1 wherein the estimated total number of impressions is determined as an extrapolation based on a number of historical auctions that are evaluated as compared to a total number of auctions that are conducted in a time period.

10. The method of claim 1 wherein the campaign is associated with a video content item, the method further comprising providing the total number of unique targeted users to a campaign sponsor.

11. The method of claim 10 wherein providing the total number of unique targeted users further comprises providing the total number of unique targeted users to a campaign sponsor in response to selection or designation of the targeting criteria.

12. The method of claim 10 wherein providing the total number of unique targeted users happens in substantially real time.

13. The method of claim 10 further comprising providing to the campaign sponsor an estimate of the number of views of the video content item in the predetermined time period.

14. The method of claim 1 wherein the serving criteria include bid information indicating a winning bid amount for an auction.

15. A user interface comprising:
a set of one or more targeting criteria controls for configuring targeting criteria for targeting content items for a campaign;
a first output control configured to display an estimated total number of impressions for the targeting criteria in a predetermined time period; and
a second output control configured to display a number of unique users that will be targeted based on the targeting criteria in the predetermined time period;
wherein:
the estimated total number of impressions is determined based at least in part on a first query on historical auction results stored as a plurality of documents, wherein the first query determines an estimated number of impressions that would occur in the plurality of documents based on the targeting criteria including generating a first count for occurrences in the plurality of documents that satisfy the first query including identifying a location in the plurality of documents wherein the first count satisfies a first threshold number of occurrences; and
the total number of unique targeted users is determined by initiating a second query starting at a next entry after the location in the plurality of documents including estimating the number of unique users for the targeting criteria based on the second query including dividing the estimated total number of impressions by an estimated frequency of impression, wherein the estimated frequency of impression is a sum of a frequency of impression for a selected number of users represented in the plurality of documents divided by the selected number of users.

16. The user interface of claim 15 wherein the total number of unique targeted users is determined based at least in part by dividing a total number of predicted impressions by a frequency at which documents satisfy the targeting criteria in the historical auction results.

17. The user interface of claim 15 wherein the campaign is associated with a video content item and the second output control is configured to display the total number of unique targeted users to a campaign sponsor.

18. The user interface of claim 17 further comprising a third output control configured to display to the campaign sponsor an estimate of the number of views of the video content item in the predetermined time period.

19. A computer program product tangibly embodied in a computer-readable storage device and comprising instructions that, when executed by a processor, cause the processor to:
- identify a campaign including one or more targeting criteria for targeting content items to users;
- determine a number of unique users that will be targeted based on the targeting criteria in a predetermined time period including:
  - identifying historical auction results including content served in response to content requests;
  - storing the historical auction results as a plurality of documents, one for each auction result, wherein storing an auction result as a document comprises storing serving criteria and a user identifier for a user that was served a content item based on the auction result;
  - evaluating the plurality of documents including initiating a first query on the plurality of documents to determine an estimated number of impressions that would occur in the plurality of documents based on the targeting criteria including generating a first count for occurrences in the plurality of documents that satisfy the query including identifying a location in the plurality of documents wherein the first count satisfies a first threshold number of occurrences;
  - determining an estimated total number of impressions for the targeting criteria in the time period based at least in part on the estimated number of impressions in the plurality of documents; and
  - determining a total number of unique targeted users including initiating a second query starting at a next entry after the location in the plurality of documents including estimating the number of unique users for the targeting criteria based on the second query including determining a frequency of impression for a plurality of the users represented in the plurality of documents as a sum of a frequency of impression for a selected number of users divided by the selected number of users and determining the total number of unique targeted users as the total number of impressions divided by the frequency of impression.

20. The computer program product of claim 19 wherein determining the total number of unique targeted users includes determining a total number of predicted impressions for the historical results and a frequency at which documents satisfy the targeting criteria in the historical results, and determining a number of unique users as the total number of predicted impressions divided by the frequency at which documents satisfy the targeting criteria in the historical auction results.

21. The computer program product of claim 19 wherein the campaign is associated with a video content item and the instructions comprise instructions to provide the total number of unique targeted users to a campaign sponsor.

22. The computer program product of claim 19 further comprising instructions to provide to the campaign sponsor an estimate of the number of views of the video content item in the predetermined time period.

* * * * *